United States Patent Office 3,077,475
Patented Feb. 12, 1963

3,077,475
METHOD OF PREPARING GLUTARIMIDE COMPOUNDS
Francis Johnson, West Newton, Mass., assignor to The Dow Chemical Company, Midland, Mich., a corporation of Michigan
No Drawing. Filed Feb. 1, 1960, Ser. No. 5,660
2 Claims. (Cl. 260—281)

This invention relates to a process for the preparation of carboxymethylglutarimide compounds from methanetriacetic compounds, and, in particular, is concerned with the preparation of 3-carboxymethylglutarimide compounds from corresponding starting materials in the nitrile form.

It is a basic object of this invention to provide a method for preparing glutarimide compounds from alklycyanomethanetriacetate compounds, utilizing a procedure, wherein cyclization of the methanetriacetic acid compound is obtained under conditions which are sufficiently mild to leave other substituent groups undisturbed, whereby it becomes possible to obtain the glutarimides in a variety of substituted forms useful for the preparation of polymers, inter-polymers and the like, as well as in subsequent synthesis in the preparation of antibiotic type compounds. In other words, the glutarimide compound as such is a useful material directly and as an intermediate in the synthesis of more complicated ring structures, partly because the compound has a heterocyclic ring carrying substituents in position suitable for reactions for other purposes.

Other objects and advantages of the invention will in part be obvious and in part appear hereinafter.

The invention accordingly is embodied in the process for preparing carboxymethylglutarimide compounds, starting with an α-cyanomethanetriacetic acid or substituted variant thereof, saponifying the said compound to the tri-salt, and oxidizing the nitrile group to an amide employing a mild oxidizing agent, such as hydrogen peroxide, and, thereafter, heating the amide tri-acid obtained through acidification to obtain therefrom a 3-carboxymethylglutarimide which is desired.

In general the materials suitable for preparation of compounds in accordance with this invention correspond in formula to the following drawing when the general formula is completed by the insertion of values therein corresponding to the definitions given and the equations summarizing the process:

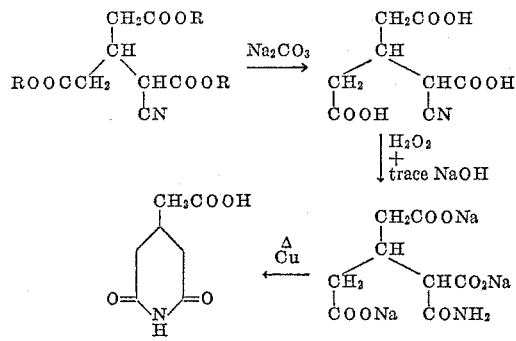

From this equation it will be apparent that the α-cyanotriacetic acid ester forms the corresponding glutarimide. Replacement of any of the hydrogens of the starting material with low molecular weight substituent groups, i.e., methyl, ethyl, low molecular weight ester groups, gives a sequence of modified compounds in accordance with the following:

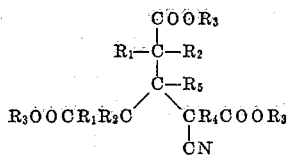

In the general formula if positions $R_1$ and $R_2$ are completed by the inclusion of a low molecular weight alkyl group or alkyl ester group it will be seen that such ester group is hydrolyzed to the acid form in the first stage of the reaction, and copper powder is added to the reaction mixture in the final stage to eliminate the extra acid group, the ester groups suitable for the $R_1$ and $R_2$ positions may be defined as selected from the group consisting of

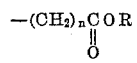

wherein R is lower alkyl and $n$ is an integer lower than 8 and

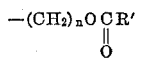

wherein R' is lower alkyl and $n$ is less than 8. The $R_3$, $R_4$ and $R_5$ moieties are lower alkyl groups.

The equations summarize the reaction.

The details of the process will be more fully understood by reference to the following specific example which is quoted herein precisely to illustrate the conditions and techniques of the reaction:

Trimethyl- α-cyanomethanetriacetate (5 parts) was added to a solution of sodium carbonate (5 parts) in water (40 parts). The mixture was stirred for 24 hours, the solution becoming a pale yellow color. A solution of hydrogen peroxide (4 parts; 30% $H_2O_2$) was then added and the mixture allowed to stand overnight. An additional 4 parts of the hydrogen peroxide solution was added and the pH of the solution adjusted to 12–12.5 units by means of 10% sodium hydroxide solution. The liquid was warmed on an oil bath to 50° C. for 1.5 hours, and then allowed to stand 1.5 hours at room temperature. A little ice was added and the pH of the solution was adjusted to 2 units by the dropwise addition of 1 N hydrochloric acid. The solution was then evaporated at low temperatures under reduced pressure, and the solid product extracted with acetone. Evaporative removal of the acetone gave an oil residue which was heated with a trace of copper powder at 180° for 15 minutes. Crystallization of the brown oil then gave 3-carboxymethylglutarimide (1 part) of M.P. 173.5–179°. A further recrystallization from methanol ethyl acetate, as a typical solvent, was effected with good recovery to give the product having a M.P. 178–80° C. The infrared spectrum of this material was identical with 3-carboxymethylglutarimide.

In accordance with the example given it will be seen that the reaction conditions are sufficiently mild so that starting with variants of this starting compound produces a substituted carboxymethylglutarimide product.

Similarly, in the first stage of the reaction it is quite clear that sodium carbonate can be replaced by another base for saponification, such as potassium carbonate;

sodium or potassium bicarbonate, or sodium or potassium hydroxides.

The hydrogen peroxide reaction employed to oxidize the nitrile group takes place without serious difficulty and generally in a range from about −25 to 125° C. Final heating to complete the cyclization can be between 100–350°.

Though the invention has been described with only a limited number of examples it is to be understood that variants thereof may be practiced without departing from its spirit or scope.

What is claimed is:

1. The method of preparing carboxymethyl glutarimide compounds which comprises providing a compound formulated in accordance with the following:

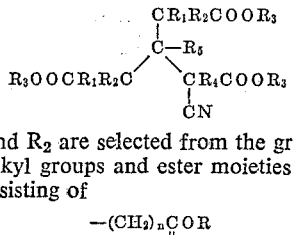

wherein $R_1$ and $R_2$ are selected from the group consisting of H lower alkyl groups and ester moieties selected from the group consisting of

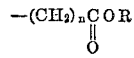

wherein R is lower alkyl and $n$ is an integer lower than 8 and $$-(CH_2)_n O \overset{\underset{\parallel}{O}}{C} R'$$

wherein $R'$ is lower alkyl and $n$ is less than 8 and $R_3$, $R_4$ and $R_5$ are lower alkyl groups, and reacting it under mild alkali conditions to remove esterifying groups, and oxidizing said acid form with said cyanide group with hydrogen peroxide to the amide salt and, thereafter, heating said amide salt at a temperature in the range from about 100° C. to 350° C. to cyclize it to the corresponding glutarimide compound.

2. The method in accordance with claim 1 in which the starting material is trimethyl α-cyanomethanetriacetate.

References Cited in the file of this patent

Legagneur et al.: Bull. Soc. Chim. France, pp. 70–75 (1953).

Phillips et al.: Journal Amer. Chem. Soc., vol. 79, pp. 3517–3519 (1957).